(12) United States Patent
Hu et al.

(10) Patent No.: US 10,371,140 B2
(45) Date of Patent: Aug. 6, 2019

(54) INVERTER MODULE FOR DRIVING A PLURALITY OF COMPRESSORS AND METHOD FOR CONTROLLING THE SAME

(71) Applicant: LG ELECTRONICS INC., Seoul (KR)

(72) Inventors: Jinseok Hu, Seoul (KR); Shinhyun Park, Seoul (KR); Gunil Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 436 days.

(21) Appl. No.: 15/021,096

(22) PCT Filed: Oct. 2, 2014

(86) PCT No.: PCT/KR2014/009351
§ 371 (c)(1),
(2) Date: Mar. 10, 2016

(87) PCT Pub. No.: WO2015/050411
PCT Pub. Date: Apr. 9, 2015

(65) Prior Publication Data
US 2016/0215771 A1     Jul. 28, 2016

(30) Foreign Application Priority Data

Oct. 4, 2013   (KR) .................. 10-2013-0118754

(51) Int. Cl.
*F04B 49/06*     (2006.01)
*F04B 49/12*     (2006.01)
(Continued)

(52) U.S. Cl.
CPC ............ *F04B 49/123* (2013.01); *F04B 15/00* (2013.01); *F04B 17/03* (2013.01); *F04B 19/22* (2013.01);
(Continued)

(58) Field of Classification Search
CPC ...... H02P 27/06; H02P 25/06; H02P 2201/05; H02M 7/5387; F04B 49/123; F04B 49/06;
(Continued)

(56) References Cited

U.S. PATENT DOCUMENTS 4,742,442 A * 5/1988 Nilssen ............... H02M 7/5387
                                                        315/102
6,330,909 B1 * 12/2001 Takahashi ............. B60H 1/005
                                                        165/202
(Continued)

FOREIGN PATENT DOCUMENTS

CN         1778032      5/2006
CN         101248273    8/2008
(Continued)

OTHER PUBLICATIONS

European Search Report dated May 10, 2017.
(Continued)

*Primary Examiner* — Essama Omgba
*Assistant Examiner* — Stephen A Mick
(74) *Attorney, Agent, or Firm* — KED & Associates LLP

(57) ABSTRACT

The present disclosure provides an inverter module capable of driving two linear compressors through three upper arm elements and three lower arm elements. To this end, an inverter module according to an embodiment may include an inverter module including a first inverter unit including a first upper arm and a first lower arm; a second inverter unit including a second upper arm, a second lower arm, a third upper arm and a third lower arm; and a controller configured to control the switching operation of the first upper arm and the first lower arm to allow the first inverter unit to drive a first compressor in a half-bridge configuration, and control the switching operation of the second upper arm, the second (Continued)

lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode.

16 Claims, 10 Drawing Sheets

(51) Int. Cl.
| | | |
|---|---|---|
| *F04B 35/04* | (2006.01) | |
| *H02M 7/5387* | (2007.01) | |
| *F04B 15/00* | (2006.01) | |
| *F04B 17/03* | (2006.01) | |
| *F04B 19/22* | (2006.01) | |
| *F25B 1/02* | (2006.01) | |
| *H02P 27/06* | (2006.01) | |
| *H02P 25/06* | (2016.01) | |

(52) U.S. Cl.
CPC .......... *F04B 35/045* (2013.01); *F04B 49/06* (2013.01); *F25B 1/02* (2013.01); *H02M 7/5387* (2013.01); *H02P 25/06* (2013.01); *H02P 27/06* (2013.01); *F04B 2203/0402* (2013.01); *H02P 2201/05* (2013.01)

(58) Field of Classification Search
CPC .......... F04B 19/22; F04B 17/03; F04B 15/00; F04B 35/045; F04B 2203/0402; F25B 1/02; F25B 49/022; F25B 2600/02; F25B 2600/021
USPC ....... 417/411; 318/400.26–400.28, 798–803, 318/135
See application file for complete search history.

(56) References Cited

U.S. PATENT DOCUMENTS

| | | | | |
|---|---|---|---|---|
| 7,099,756 B2* | 8/2006 | Sato | ...................... | B60W 10/08 |
| | | | | 701/22 |
| 9,002,533 B2* | 4/2015 | Kaufer | ................. | H04L 12/403 |
| | | | | 701/1 |
| 9,097,255 B2* | 8/2015 | Kobayashi | ............ | F04C 23/001 |
| 10,047,992 B2* | 8/2018 | Ushijima | .............. | F25B 49/022 |
| 2004/0000155 A1* | 1/2004 | Cline | ...................... | F24F 3/065 |
| | | | | 62/175 |
| 2005/0223724 A1* | 10/2005 | Crane | ................... | F25B 49/025 |
| | | | | 62/175 |
| 2007/0056300 A1* | 3/2007 | Crane | ................... | F25B 49/025 |
| | | | | 62/175 |
| 2008/0290824 A1 | 11/2008 | Choi et al. | | |
| 2009/0092502 A1* | 4/2009 | Marcinkiewicz | ....... | F04B 49/06 |
| | | | | 417/63 |
| 2013/0186111 A1* | 7/2013 | Kim | ...................... | F25B 49/022 |
| | | | | 62/56 |
| 2013/0192294 A1* | 8/2013 | Yoo | ........................ | F04B 49/02 |
| | | | | 62/510 |
| 2014/0092655 A1* | 4/2014 | Igarashi | .................. | B60L 3/003 |
| | | | | 363/56.03 |

FOREIGN PATENT DOCUMENTS

| | | |
|---|---|---|
| CN | 102828943 | 12/2012 |
| CN | 103225601 | 7/2013 |
| EP | 2 535 586 | 12/2012 |
| JP | 2004-343993 A | 12/2004 |
| JP | 2008-099415 A | 4/2008 |
| JP | 2010-124540 A | 6/2010 |
| JP | 2013-046445 | 3/2013 |
| KR | 10-2009-0075526 A | 7/2009 |
| KR | 10-2013-0080276 | 7/2013 |
| WO | WO 2007/013821 | 2/2007 |

OTHER PUBLICATIONS

DC Voltage Balancing Control of Half-Bridge PWM Inverter for Linear Compressor; Je-Wook Park et al; 3$^{rd}$ IEEE International Symposium on Power Electronics for Distributed Generation Systems (PEDG) 2012; pp. 598-602; (XP32226623), Chinese Office Action dated Aug. 1, 2017, issued in Application No. 201480051804.2 (with English translation).

International Search Report dated Jan. 14, 2015 issued in Application No. PCT/KR2014/009381.

* cited by examiner

INVERTER MODULE FOR DRIVING A PLURALITY OF COMPRESSORS AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2014/009351, filed Oct. 2, 2014, which claims priority to Korean Patent Application No. 10-2013-0118754, filed Oct. 4, 2013, whose entire disclosures are hereby incorporated by reference.

TECHNICAL FIELD

The present disclosure relates to an inverter module for driving a plurality of compressors and a method for controlling the same.

BACKGROUND ART

In general, a compressor as a device for converting mechanical energy into the compression energy of fluid is used for a portion of a refrigeration system such as a refrigerator, an air conditioner, or the like.

The compressor is largely divided into a reciprocating compressor in which a compression space for inhaling or discharging a working gas is formed between a piston and a cylinder such that the piston compresses refrigerant while moving the piston in a linearly reciprocating manner within the cylinder, a rotary compressor in which a compression space for inhaling or discharging a working gas is formed between an eccentrically rotating roller and a cylinder such that the roller compresses refrigerant while being eccentrically rotated along an inner wall of the cylinder, and a scroll compressor in which a compression space for inhaling or discharging a working gas is formed between an orbiting scroll and a fixed scroll such that the orbiting scroll compress refrigerant while being rotated along the fixed scroll.

The reciprocating compressor performs a linearly reciprocating movement on an inner piston within the cylinder to inhale, compress and discharge refrigerant gas. The reciprocating compressor may be divided into a recipro type and a linear type.

The recipro type is a scheme in which a crankshaft is coupled to a rotating motor, and a piston is coupled to the crankshaft to convert a rotational movement of the motor to a linearly reciprocating movement. On the contrary, the linear type is a scheme in which a piston is connected to a mover of a motor performing a linear movement to convert the linear movement of the motor into a reciprocating movement of the piston.

The reciprocating compressor may include a power unit configured to generate a driving force and a compression unit configured to receive the driving force from the power unit to compress fluid. In general, a motor is mostly used for the power unit, and a linear motor is used in case of the linear type.

The linear motor does not require a mechanical conversion device and has an uncomplicated structure since the motor itself directly generates a linear driving force. Furthermore, the linear motor has a characteristic of reducing loss due to energy conversion as well as reducing noise since there is no connecting portion that generates friction and abrasion. Furthermore, when a linear type reciprocating compressor (hereinafter, referred to as a "linear compressor") is used for an air conditioner, a stroke voltage applied to the linear compressor is changed to change a compression ratio, and thus has an advantage that can be also used for freezing capacity variable control.

On the other hand, for the reciprocating compressor, particularly, linear compressor, the piston collides a cylinder wall or the piston is unable to move forward due to a large load not to properly perform compression when a voltage is abruptly, excessively applied since the piston performs a reciprocating movement while not being mechanically restricted within the cylinder. Accordingly, a control device for controlling the movement of the piston to a load variation or voltage variation is required.

The control device of the linear compressor may be a power conversion device, and perform a power conversion function (for example, AC-DC-AC conversion), thus driving a linear motor through an inverter module.

In general, the power conversion device may include an intelligent power module (IPM), and the intelligent power module (IPM) may be implemented in the form of containing the inverter.

Typically, one intelligent power module (IPM) having three upper arm elements and three lower arm elements may be used to control the U, V and W phases of a 3-phase motor.

However, in case where it is an application field requiring a plurality of refrigeration cycles (for example, when there exist separate refrigeration cycles for a refrigerating chamber and a freezing chamber) or an application field for which a multi-stage refrigeration cycle is used according to an efficient operation or load variation of the compressor, a refrigerator may include a plurality of compressors and a plurality of evaporators.

Accordingly, a plurality of intelligent power modules (IPMs) may be required to drive a plurality of compressors. For example, two intelligent power modules (IPM) may be required to drive two compressors.

As a result, a technology for driving a larger number of compressors through a smaller number of intelligent power modules (IPM) may be required for its simple control and cost reduction.

DISCLOSURE OF INVENTION

Technical Problem

An aspect of the present disclosure relates to an inverter module capable of driving two linear compressors through three upper arm elements and three lower arm elements.

Solution to Problem

An inverter module according to the present disclosure may include a first inverter unit including a first upper arm and a first lower arm; a second inverter unit including a second upper arm, a second lower arm, a third upper arm and a third lower arm; and a controller configured to control the switching operation of the first upper arm and the first lower arm to allow the first inverter unit to drive a first compressor in a halfbridge configuration, and control the switching operation of the second upper arm, the second lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode.

According to an example associated with the present disclosure, the first compressor and the second compressor may be linear compressors comprising a linear motor.

According to an example associated with the present disclosure, the inverter module may further include a connecting portion comprising a relay, wherein the controller controls the relay to separate the first inverter unit from the second inverter unit in the first operation mode, and controls the relay to interlock the first inverter unit with the second inverter unit in the second operation mode.

According to an example associated with the present disclosure, the first compressor may be a compressor for compressing refrigerant for a refrigerating chamber of a refrigerator, and the second compressor may be a compressor for compressing refrigerant for a freezing chamber of the refrigerator.

According to an example associated with the present disclosure, in case of the first operation mode, a driving frequency of the first inverter unit may be determined based on a compression efficiency of the first compressor, and a driving frequency of the second inverter unit may be determined based on a compression efficiency of the second compressor.

According to an example associated with the present disclosure, in case of the second operation mode, a driving frequency of the first inverter unit and a driving frequency of the second inverter unit may be the same.

According to an example associated with the present disclosure, a driving frequency of the first inverter unit and a driving frequency of the second inverter unit may be determined based on a compression efficiency of either one of the first compressor and the second compressor.

According to an example associated with the present disclosure, the first operation mode may be a power saving mode for driving a low load requiring a relatively lower cooling capacity compared to the second operation mode, and the second operation mode may be a power mode for driving a high load requiring a relatively higher cooling capacity compared to the first operation mode.

According to an example associated with the present disclosure, the controller may set the operation mode of the inverter module to either one of the first operation mode and the second operation mode based on a specific criteria.

According to an example associated with the present disclosure, the specific criteria may be whether or not a cooling power required for the first compressor and the second compressor is greater than a reference cooling power or whether or not a motor input voltage required for a motor contained in at least one of the first compressor and the second compressor is greater than an input voltage of the inverter module.

According to an example associated with the present disclosure, the specific criteria may be whether or not a cooling power required for the first compressor and the second compressor is greater than a reference cooling power, and the controller may set the operation mode of the inverter module to the second operation mode when a cooling power required for the first compressor and the second compressor is greater than a reference cooling power, and set the operation mode of the inverter module to the first operation mode in the opposite case.

According to an example associated with the present disclosure, the specific criteria may be whether or not a motor input voltage required for a motor contained in at least one of the first compressor and the second compressor is greater than an input voltage of the inverter module, and the controller may set the operation mode of the inverter module to the second operation mode when a motor input voltage required for a motor contained in at least one of the first compressor and the second compressor is greater than an input voltage of the inverter module, and set the operation mode of the inverter module to the first operation mode in the opposite case.

According to an example associated with the present disclosure, when the operation mode of the inverter module should be changed from either one of the first operation mode and the second operation mode to the other operation mode during the setting of the operation mode of the inverter module, the controller may deactivate the first compressor and the second compressor for a first period of time, and changes the operation mode of the inverter module after a second period of time from a time point when the first compressor and the second compressor are deactivated, and activate the first compressor and the second compressor subsequent to changing the operation mode of the inverter module to operate the inverter module in the changed operation mode.

According to an example associated with the present disclosure, the first period of time may be greater than 10 seconds, and the second period of time may be 9 to 10 seconds.

According to an example associated with the present disclosure, the controller may activate the first compressor and the second compressor after a third period of time from a time point when the operation mode of the inverter module is changed.

According to an example associated with the present disclosure, the third period of time may be three seconds.

Furthermore, a refrigerator according to the present disclosure may include a refrigerator body; a first compressor and a second compressor provided in the refrigerator body to compress refrigerant, and an inverter module configured to drive the first compressor and the second compressor, wherein the inverter module is an inverter module according to an example associated with the present disclosure.

Furthermore, there is provided a method of controlling an inverter module including a first inverter unit including a first upper arm and a first lower arm; a second inverter unit including a second upper arm, a second lower arm, a third upper arm and a third lower arm; and a controller configured to control the switching operation of the first upper arm and the first lower arm to allow the first inverter unit to drive a first compressor in a half-bridge configuration, and control the switching operation of the second upper arm, the second lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode, and the method may include allowing the controller to determine whether or not a cooling power required for the first compressor and the second compressor is greater than a reference cooling power or whether or not a motor input voltage required for a motor contained in either one of the first compressor and the second compressor is greater than an input voltage of the inverter module; and allowing the controller to set the operation mode of the inverter module to either one of the first operation mode and the second operation mode based on the determination result.

According to an example associated with the present disclosure, said setting the operation mode may include deactivating the first compressor and the second compressor for a first period of time; changing the operation mode of the inverter module after a second period of time from a time point when the first compressor and the second compressor are deactivated; and activating the first compressor and the second compressor subsequent to changing the operation mode of the inverter module to operate the inverter module in the changed operation mode.

According to an example associated with the present disclosure, said operating the inverter module in the changed operation mode may activate the first compressor and the second compressor after a third period of time from a time point when the operation mode of the inverter module is changed.

Advantageous Effects of Invention

According to an inverter module according to an embodiment disclosed in the present disclosure, there is an advantage that two linear compressors are driven with one inverter module including three upper arm elements and three lower arm elements.

In particular, according to an inverter module according to an embodiment disclosed in the present disclosure, there is an advantage that two linear compressors are driven in a half-bridge configuration and in a full-bridge configuration, respectively, in a low load operation mode requiring a relatively low cooling power to allow independent driving frequency control, and the two linear compressors are both driven in a fullbridge configuration in a high load operation mode requiring a relatively high cooling power to allow high power control.

BEST MODE FOR CARRYING OUT THE INVENTION

Figure 1:
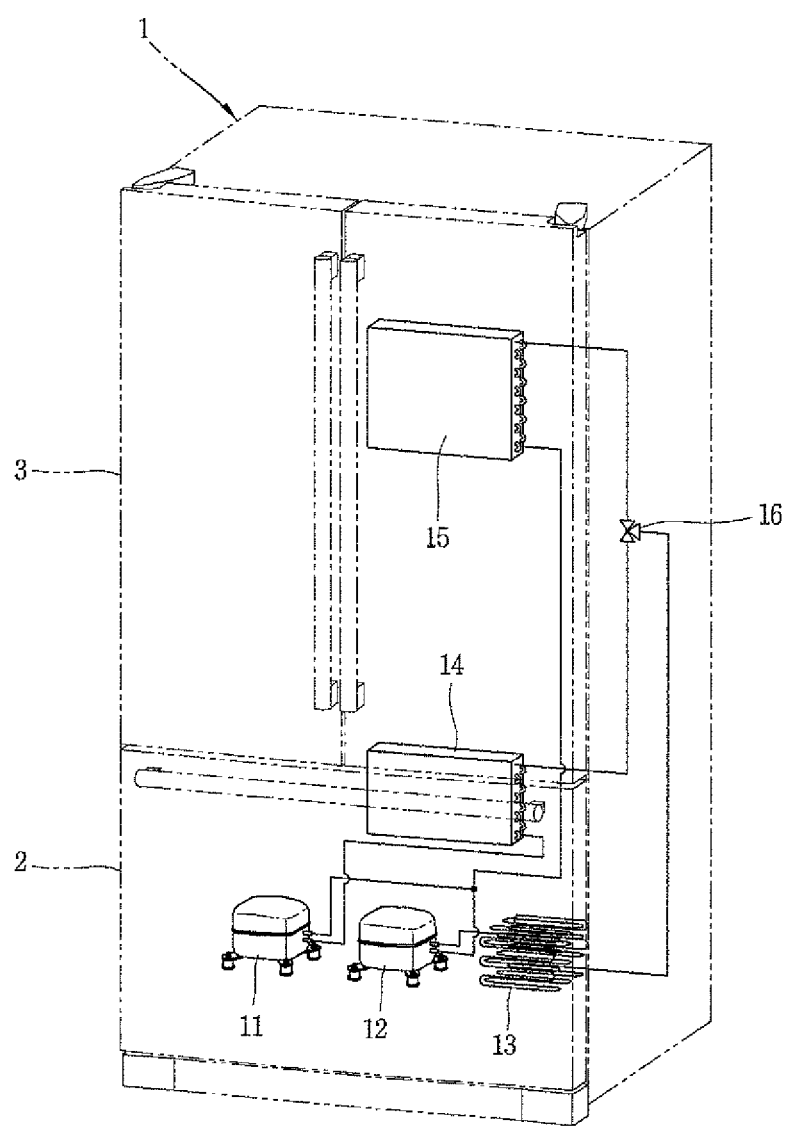
FIG. 1 is a perspective view schematically illustrating a refrigerator to which a 2-stage/2-comp refrigeration cycle according to an embodiment disclosed in the present disclosure is applied.

A technology disclosed in the present disclosure relates to an inverter module for driving a motor, and more particularly, an inverter module disclosed in the present disclosure may be used for a compressor or the like applicable to a refrigerator or air conditioner, but the technology disclosed in the present disclosure may be applicable to various home appliances or electronic devices in which the inverter module can be used.

In particular, an inverter module disclosed in the present disclosure is to drive a linear motor contained in a linear compressor, and two linear compressors may be independently or concurrently driven according to an operation mode through an intelligent power module (IPM) having three upper arm elements and three lower arm elements.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, the embodiments disclosed herein will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Description of Refrigeration Cycle, Refrigerator and Linear Compressor

Hereinafter, a linear compressor in which an inverter module according to an embodiment disclosed in the present disclosure can be applied or used, and a refrigeration cycle and refrigerator using the same will be described with reference to FIGS. 1 through 3.

As described above, in case of an application field in which a refrigeration cycle is carried out in multiple stages according to an efficient operation and load variation of the compressor or an application field that requires a plurality of refrigeration cycles (in case where refrigeration cycles for a refrigerating chamber and a freezing chamber separately exist), a refrigerator may include a plurality of compressors and a plurality of evaporators.

In the former application field in which a refrigeration cycle is carried out in multiple stages according to an efficient operation and load variation of the compressor, a 2-stage/2-comp refrigeration cycle may be used.

Furthermore, in the latter application field that requires a plurality of refrigeration cycles, a so-called 2-comp/2-cycle refrigeration cycle may be used.

During a so-called 2-stage/2-comp refrigeration cycle having a plurality of compressors and a plurality of evaporators, one-stage compressed refrigerant is introduced from a first compressor (or low stage compressor) to a second compressor (or high stage compressor) to circulate the refrigeration cycle while being compressed in two stages. Oil is recovered to each compressor while circulating the refrigeration cycle along with refrigerant.

Figure 2:
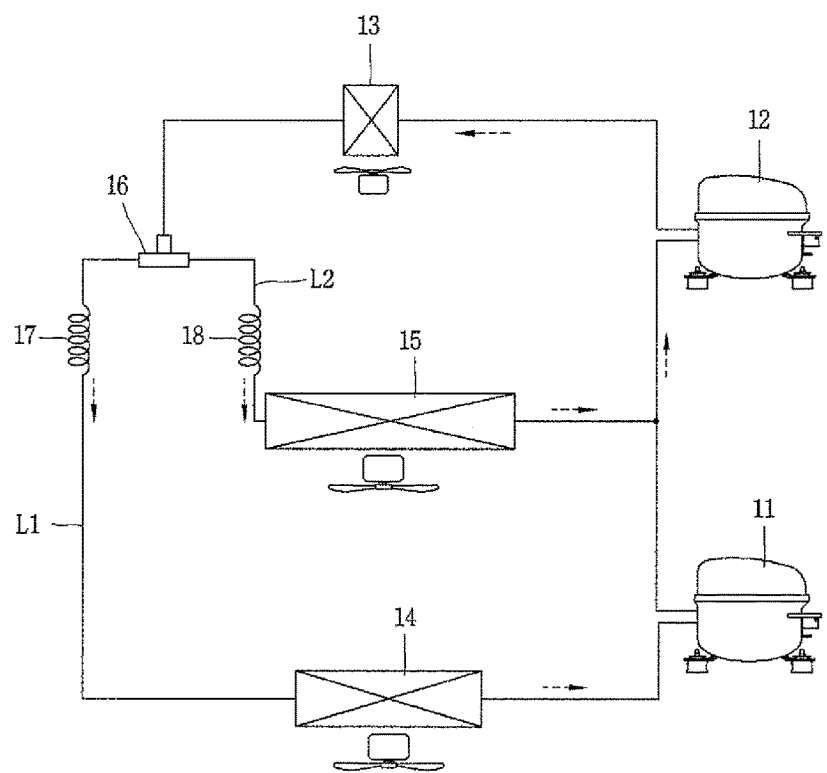
FIG. 2 is an exemplary view illustrating a 2-stage/2-comp refrigeration cycle according to an embodiment disclosed in the present disclosure.

FIG. 1 is a perspective view schematically illustrating a refrigerator to which a 2-stage/2-comp refrigeration cycle according to an embodiment disclosed in the present disclosure is applied, and FIG. 2 is an exemplary view illustrating a 2-stage/2-comp refrigeration cycle according to an embodiment disclosed in the present disclosure.

As illustrated in FIGS. 1 and 2, a refrigerator having a refrigeration cycle according to the present disclosure may include a refrigerator body 1 having a freezing chamber and a refrigerating chamber, a freezing chamber door 2 and a refrigerating chamber door 3 for opening and closing the freezing chamber and refrigerating chamber of the refrigerator body 1.

A machine room is provided at a lower side of the refrigerator body 1, and compressors 11, 12 and a condenser 13 of the refrigeration cycle for generate cool air are installed in the machine room. A plurality of the compressors 11, 12 are connected in a series, namely, refrigerant compressed in one stage in the first compressor 11 is compressed in two stages such that a discharge port of the first compressor 11 is connected to a suction port of the second compressor 12. The discharge port of the second compressor 12 is connected to an inlet port of the evaporator 13. The first compressor 11 and 12 may be designed to have the same capacity, but in case of a typical refrigerator, the capacity of the second compressor 12 for implementing the operation of the refrigerating chamber may be designed to be two times larger than that of the first compressor 11 since the refrigerating chamber is mostly operated.

Furthermore, a plurality of evaporators 14, 15 constituting part of the refrigeration cycle are branched from an outlet port of the condenser 13 and connected in parallel to a first branch pipe (L1) and a second branch pipe (L2). A refrigerant switching valve 16 consisting of a 3-way valve or 4-way valve controlling the flow direction of refrigerant are provided at a branch point branched to the first branch pipe (L1) and second branch pipe (L2), and a first expansion apparatus 17 and a second expansion apparatus 18 for expanding refrigerant are provided in the middle of each branch pipe L1, L2, namely, at an inlet end of both the evaporators 14, 15. A blower fan is provided between the condenser 13 and one side of the first expansion apparatus 17 and second expansion apparatus 18, respectively.

The refrigerant switching valve 16 may be formed with a 3-way valve. For example, the refrigerant switching valve 16 may be formed in a structure that either one of the evaporators can be selectively communicated with an outlet port of the condenser 13 or both the evaporators can be concurrently communicated therewith.

Furthermore, one of the plurality of evaporators 14, 15 may be provided at a rear wall surface of the freezing chamber whereas the other one may be provided on a rear wall surface of the refrigerating chamber. An evaporator (hereinafter, referred to as a "first evaporator") 14 provided at a side of the freezing chamber and an evaporator (hereinafter, referred to as a "second evaporator") 15 provided in the refrigerating chamber may be formed to have the same capacity, but the second evaporator 15 may be formed with a larger capacity compared to the first evaporator 14 similarly to that of the compressors.

A refrigerator having the foregoing refrigeration cycle according to the present disclosure may perform a simultaneous operation in which the refrigerant switching valve 16 controls the flow direction of refrigerant in a first evaporator direction or second evaporator direction to operate the refrigerating chamber and freezing chamber at the same time or a freezing chamber operation in which only the freezing chamber is operated or a refrigerating chamber operation in which only the refrigerating chamber is operated.

For example, when the operation mode of the refrigerator is a simultaneous operation for operating the freezing chamber and refrigerating chamber at the same time, all the refrigerant switching valves 16 are open such that refrigerant passing through the condenser 13 is distributed and moved in the first evaporator 14 and second evaporator 15 directions. At the same time, both the first compressor 11 and second compressor 12 start the operation.

Then, refrigerant inhaled to the first compressor 11 through the first evaporator 14 is compressed and discharged in one stage in the first compressor 11 and onestage-compressed refrigerant discharged from the first compressor 11 is inhaled into the second compressor 12. At this time, refrigerant passing through the second evaporator 15 is mixed with refrigerant compressed and discharged in one stage in the first compressor 11 and inhaled into the second compressor 12.

Then, a series of processes in which the one-stage-compressed refrigerant and refrigerant that has passed through the second compressor 12 are compressed and discharged in the second compressor 12, and refrigerant discharged from the second compressor 12 is moved to the condenser 13 to be condensed, and the condensed refrigerant in the condenser 13 is distributed and circulated in the first evaporator 14 and second evaporator 15 directions from the refrigerant switching valve 16 are repeated.

Next, when the operation mode of the refrigerator is a freezing chamber operation, the refrigerant switching valve 16 may block the evaporator at a side of the refrigerating chamber, namely, the second evaporator 15 direction, and open only the first evaporator 14 direction which is a side of the freezing chamber, thereby allowing refrigerant passing through the condenser 13 to move only in the first evaporator 14 direction. However, the first compressor 11 and second compressor 12 are operated at the same time, and thus refrigerant that has passed through the first evaporator 14 is compressed and circulated in two stages while sequentially passing through the first compressor 11 and second compressor 12.

Next, when the operation mode of the refrigerator is a refrigerating chamber operation, the refrigerant switching valve 16 blocks the first evaporator 14 direction and opens the second evaporator 15 direction. Then, the first compressor 11 is suspended, but only the operation of the second compressor 12 is initiated.

Then, a series of processes in which refrigerant passing through the condenser 13 is moved only in the second evaporator 15 direction and inhaled into the second compressor 12, and refrigerant compressed and discharged from the second compressor 12 is moved to the condenser 13 are repeated.

Figure 3:
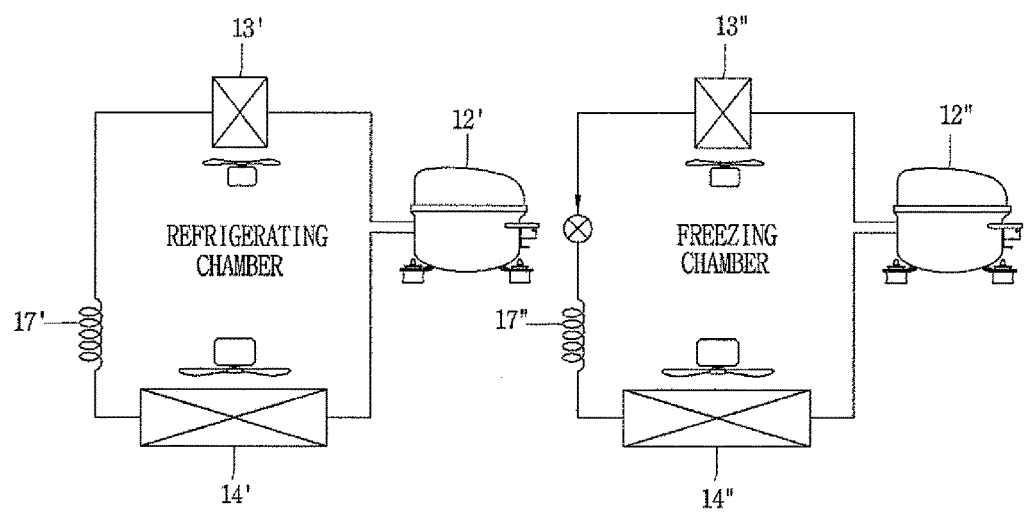
FIG. 3 is an exemplary view illustrating a 2-comp/2-cycle refrigeration cycle.

FIG. 3 is an exemplary view illustrating a 2-comp/2-cycle refrigeration cycle.

Referring to FIG. 3, the 2-comp/2-cycle refrigeration cycle may include two refrigeration cycles which are independently operated through each of the two compressors 12', 12".

In each independent refrigeration cycle, cool air supplied into the refrigerator is generated by a heat-exchanging operation of refrigerant, and continuously supplied into the refrigerator while repeatedly performing a compression-condensation-expansion-evaporation cycle. The supplied refrigerant is uniformly delivered into the refrigerator due to convection to store food within the refrigerator at a desired temperature.

For example, in case of FIG. 3, a refrigeration cycle in the refrigerating chamber may be formed by repeatedly performing a compression-condensation-expansion-evaporation cycle through the first compressor 12', first condenser 13', first expansion apparatus 17' and first evaporator 14'.

Furthermore, for example, a refrigeration cycle in the freezing chamber may be formed by repeatedly performing a compression-condensation-expansion-evaporation cycle through the second compressor 12", second condenser 13", second expansion apparatus 17" and second evaporator 14".

In case of FIG. 3, an arrangement or configuration of two compressors within a refrigerator
may be similar to that of the compressor disclosed in FIG. 1, but a connecting relation or location relation to other constituent elements (for example, evaporator, condenser, expansion apparatus, etc.) may be changed.

Furthermore, the arrangement or configuration of two compressors, respectively, may perform the role of forming a refrigeration cycle for each of the refrigerating chamber and freezing chamber, and thus freely changed within the scope of the present invention. For example, the first compressor 12' may be disposed adjacent to the refrigerating chamber, and the second compressor 12" may be disposed adjacent to the freezing chamber.

Figure 4:
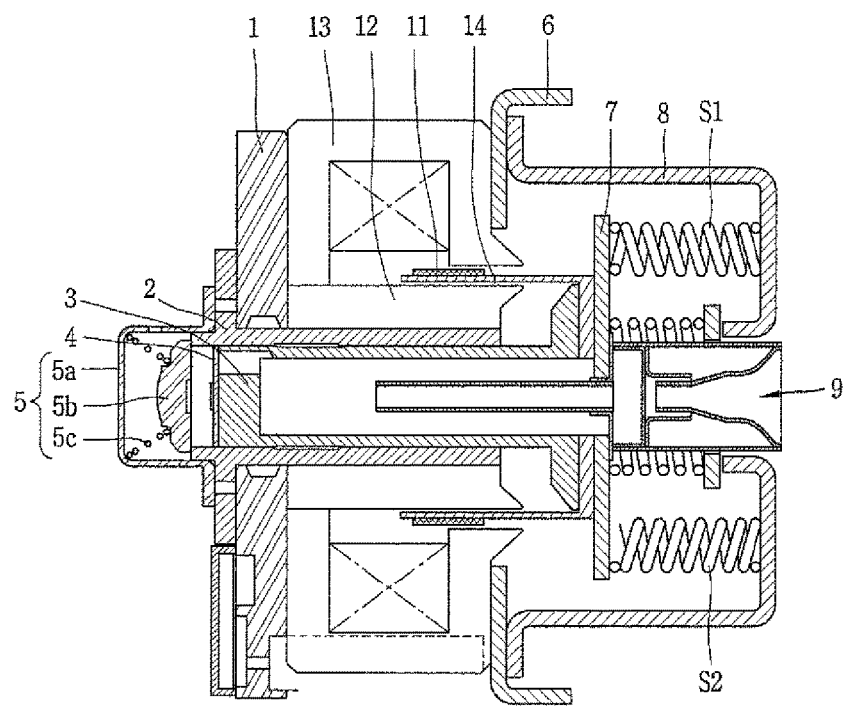
FIG. 4 is a schematic view illustrating a linear compressor according to an embodiment disclosed in the present disclosure.

FIG. 4 is a schematic view illustrating a linear compressor according to an embodiment disclosed in the present disclosure.

Referring to FIG. 4, for a linear compressor according to an embodiment, a structure consisting of a frame 1, a cylinder 2, a piston 3, a suction valve 4, a discharge valve assembly 5, a motor cover 6, a supporter 7, a body cover 8, main springs (S1, S2), a muffler assembly 9, and a linear motor 10 may be provided to be elastically supported within a shell (not shown).

The cylinder 2 is inserted and fixed to the frame 1, and the discharge valve assembly 5 including a discharge valve 5a, discharge cap 5b and a discharge valve spring 5c is provided to block an end of the cylinder 2, whereas the piston 3 is inserted into the cylinder 2, and a thin suction valve 4 is provided to switch the inlet port 3a.

The linear motor 10 is provided to allow a permanent magnet 13 to perform a reciprocating
linear movement while maintaining a gap between an inner stator 11 and an outer stator 12, and the permanent magnet 13 is provided to be connected to the piston 3 through the mover 14, and thus the permanent magnet 13 fixed to the mover 14 operates the piston 3 while performing a reciprocating linear movement by a mutual electromagnetic force between the inner stator 11 and outer stator 12 and the permanent magnet 13.

Inverter Module for Driving Two Compressors Through V-Phase Sharing

Hereinafter, an example of driving two compressors with one inverter module (or intelligent power module (IPM)) through V-phase sharing will be described with reference to FIG. 5.

Figure 5:
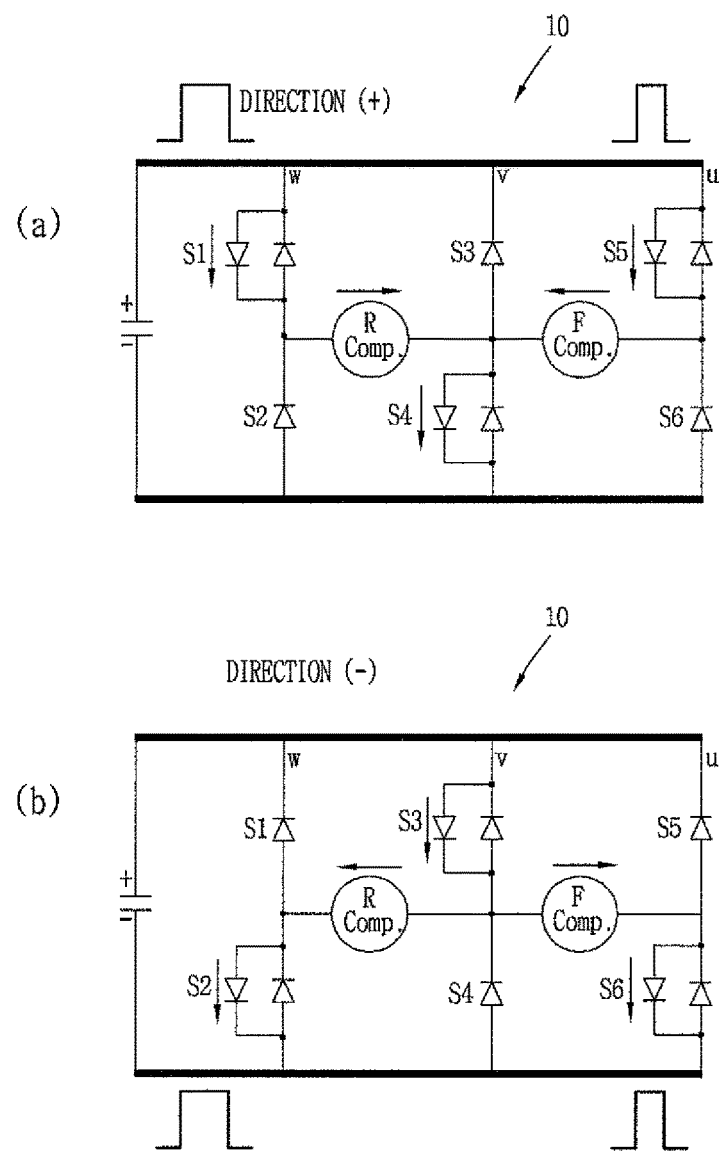
FIG. 5 illustrates an example for driving two compressors with one inverter module through V-phase sharing.

FIG. 5 illustrates an example for driving two compressors with one inverter module through V-phase sharing.

Referring to FIG. 5, one inverter module for driving a 3-phase motor having U, W and V phases may be used to drive two single-phase linear motors (or two linear compressors including single-phase linear motors).

In other words, two compressors (C110, C120) may be driven by one inverter module in which any one of the U, W and V phases is shared.

For example, the two compressors (C110, C120) may be driven by one inverter module 10 in which the V-phase is shared.

The first compressor C110 between the two compressors may be a compressor (R-comp, Refrigerator-comp) for compressing refrigerant for the refrigerating chamber, and the second compressor C120 may be a compressor (F-comp, Freezercompressor) for compressing refrigerant for the freezing chamber.

The two compressors, respectively, may be driven in a full-bridge configuration.

Specifically, referring FIG. 5A, when the direction of a motor driving current is plus (+), the first upper arm (S1), second lower arm (S4) and third upper arm (S5) of six switching elements (three upper arms and three lower arms, S1-S6) are turned on, and the remaining elements (S2, S3, S6) are turned off. The specific direction of a current is illustrated in FIG. 5A.

Furthermore, referring to FIG. 5B, when the direction of a motor driving current is minus (−), the first lower arm (S2), second upper arm (S3) and third lower arm (S6) of six switching elements (three upper arms and three lower arms, S1-S6) are turned on, and the remaining elements (S1, S4, S5) are turned off. The specific direction of a current is illustrated in FIG. 5B.

However, when two compressors (C110, C120) are driven with one inverter module (or intelligent power module (IPM)) through V-phase sharing, the two compressors (C110, C120) should be driven at the same driving frequency.

In other words, when two compressors (C110, C120) are driven with one inverter module (or intelligent power module (IPM)) through V-phase sharing, independent voltage control for the two compressors is allowed but independent frequency control is not allowed.

In this case, there is a problem in which each compressor cannot be all operated at an efficient operating frequency (or driving frequency).

It is because each compressor is required to have the same MK resonant frequency and operating frequency to maximize an efficiency of the linear compressor.

Accordingly, when two compressors (C110, C120) are driven with one inverter module (or intelligent power module (IPM)) through V-phase sharing, two compressors should be driven at the same frequency in the aspect of hardware in spite of having different MK resonant frequencies due to a different load for each compressor.

As a result, when two compressors (C110, C120) are driven with one inverter module (or intelligent power module (IPM)) through V-phase sharing, both the two compressors may not be driven at an operating frequency with the maximum efficiency, thereby suppressing the efficiency maximization.

The MK resonant frequency may be defined by a mass (M) of a moving member consisting of a piston and a permanent magnet and a spring constant (K) of springs supporting the moving member.

The moving member is supported by mechanical springs at both sides on the basis of a linear movement direction with respect to a fixed member consisting of a cylinder and stators, and thus an M-K resonant frequency defined by a mass (M) of the moving member and a spring constant (K) of springs supporting the moving member is produced, and a power frequency applied to the linear motor is designed to follow the M-K resonant frequency, thereby optimizing the efficiency of the linear compressor.

Accordingly, it may be required to provide an independent driving frequency for each compressor according to a state of the compressor or operating state of the compressor.

Here, the state of the compressor or operating state of the compressor may be a load state connected to the compressor, or the like. For example, the state of the compressor may denote a low load state requiring a relatively low cooling capacity or a high load state requiring a relatively low cooling capacity.

Hereinafter, an inverter module according to an embodiment disclosed in the present disclosure will be described in detail with reference to FIGS. 6 through 8.

Inverter Module According to an Embodiment Disclosed in the Present Disclosure

An inverter module according to an embodiment disclosed in the present disclosure may include a first inverter unit including a first upper arm and a first lower arm; a second inverter unit including a second upper arm, a second lower arm, a third upper arm and a third lower arm; and a controller configured to control the switching operation of the first upper arm and the first lower arm to allow the first inverter unit to drive a first compressor in a half-bridge configuration, and control the switching operation of the second upper arm, the second lower arm, the third upper arm and the third lower arm to allow the second inverter unit to drive a second compressor in a fullbridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a fullbridge configuration during a second operation mode.

According to an embodiment, the first compressor and the second compressor may be linear compressors comprising a linear motor.

The inverter module according to an embodiment may further include a connecting portion comprising a relay, wherein the controller controls the relay to separate the first inverter unit from the second inverter unit in the first operation mode.

Furthermore, the controller may control the relay to interlock the first inverter unit with the second inverter unit in the second operation mode.

Furthermore, according to an embodiment, the first compressor may be a compressor for compressing refrigerant for a refrigerating chamber of a refrigerator, and the second compressor may be a compressor for compressing refrigerant for a freezing chamber of the refrigerator.

Furthermore, according to an embodiment, in case of the first operation mode, a driving frequency of the first inverter unit may be determined based on a compression efficiency of the first compressor, and a driving frequency of the second inverter unit may be determined based on a compression efficiency of the second compressor.

Furthermore, according to an embodiment, in case of the second operation mode, a driving frequency of the first inverter unit and a driving frequency of the second inverter unit may be the same.

Furthermore, according to an embodiment, a driving frequency of the first inverter unit and a driving frequency of the second inverter unit may be determined based on a compression efficiency of either one of the first compressor and the second compressor.

Furthermore, according to an embodiment, the first operation mode may be a power saving mode for driving a low load requiring a relatively lower cooling capacity compared to the second operation mode, and the second operation mode may be a power mode for driving a high load requiring a relatively higher cooling capacity compared to the first operation mode.

Furthermore, according to an embodiment, the controller may set the operation mode of the inverter module to either one of the first operation mode and the second operation mode based on a specific criteria.

Furthermore, according to an embodiment, the specific criteria may be whether or not a cooling power required for the first compressor and the second compressor is greater than a reference cooling power or whether or not a motor input voltage required for a motor contained in at least one of the first compressor and the second compressor is greater than an input voltage of the inverter module.

Furthermore, according to an embodiment, the specific criteria may be whether or not a cooling power required for the first compressor and the second compressor is greater than a reference cooling power, and the controller may set the operation mode of the inverter module to the second operation mode when a cooling power required for the first compressor and the second compressor is greater than a reference cooling power, and set the operation mode of the inverter module to the first operation mode in the opposite case.

Furthermore, according to an embodiment, the specific criteria may be whether or not a motor input voltage required for a motor contained in at least one of the first compressor and the second compressor is greater than an input voltage of the inverter module, and the controller may set the operation mode of the inverter module to the second operation mode when a motor input voltage required for a motor contained in at least one of the first compressor and the second compressor is greater than an input voltage of the inverter module, and set the operation mode of the inverter module to the first operation mode in the opposite case.

Furthermore, according to an embodiment, when the operation mode of the inverter module should be changed from either one of the first operation mode and the second operation mode to the other operation mode during the setting of the operation mode of the inverter module, the controller may deactivate the first compressor and the second compressor for a first period of time, and changes the operation mode of the inverter module after a second period of time from a time point when the first compressor and the second compressor are deactivated, and activate the first compressor and the second compressor subsequent to changing the operation mode of the inverter module to operate the inverter module in the changed operation mode.

Furthermore, according to an embodiment, the first period of time may be greater than 10 seconds, and the second period of time may be 9 to 10 seconds.

Furthermore, according to an embodiment, the controller may activate the first compressor and the second compressor after a third period of time from a time point when the operation mode of the inverter module is changed.

Furthermore, according to an embodiment, the third period of time may be three seconds.

Furthermore, a refrigerator according to the present disclosure may include a refrigerator body; a first compressor and a second compressor provided in the refrigerator body to compress refrigerant, and an inverter module configured to drive the first compressor and the second compressor, wherein the inverter module is an inverter module corresponding to any one of claims 1 through 16.

Figure 6:
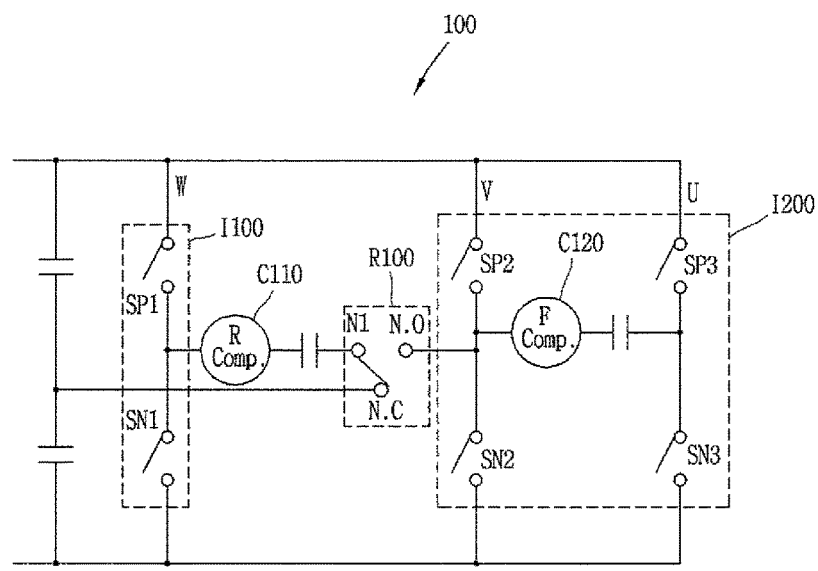
FIG. 6 is an exemplary view illustrating an inverter module according to an embodiment disclosed in the present disclosure.

FIG. 6 is an exemplary view illustrating an inverter module according to an embodiment disclosed in the present disclosure.

Referring to FIG. 6, the inverter module 100 according to an embodiment disclosed in the present disclosure may include a first inverter unit (I100), a second inverter unit (I200), and a controller (not shown).

The first inverter unit (I100) may include a first upper arm (SP1) and a first lower arm (SN1).

The second inverter unit (I200) may include a second upper arm (SP2), a second lower arm (SN2), a third upper arm (SP3) and a third lower arm (SN3).

The first upper arm through third lower arms (SP1-SN3) are switching elements.

According to an embodiment, the first upper arm through third lower arms (SP1-SN3) may be at least one of an insulated gate bipolar transistor (IGBT), a MOSFET, and a BJT.

The first inverter unit (I100) and the second inverter unit (I200) may drive the first compressor (C110) and second compressor (C120) in an independent or interlocking manner according to an operation mode.

Here, the first compressor (C110) and the second compressor (C120) may be a linear compressor including a linear motor.

According to an embodiment, the first compressor (C110) may be a compressor for compressing refrigerant for a refrigerating chamber of the refrigerator, and the second compressor (C120) may be a compressor for compressing refrigerant for a freezing chamber of the refrigerator.

According to an embodiment, the controller (not shown) may control the switching operation of the first upper arm (SP1) and the first lower arm (SN1) to allow the first inverter unit (I100) to drive the first compressor (C110) in a half-bridge configuration.

Furthermore, when the operation mode is a first operation mode, the controller may control the switching operation of the second upper arm (SP2), the second lower arm (SN2), the third upper arm (SP3) and the third lower arm (SN3) to allow the second inverter unit (I200) to drive the second compressor (C120) in a full-bridge configuration.

Accordingly, when the operation mode is a first operation mode, the first inverter unit (I100) and the second inverter unit (I200) may independently drive the first compressor (C110) and the second compressor (C120), respectively.

Furthermore, according to an embodiment, when the operation mode is a second operation mode, the controller may control the switching operation of the first upper arm (SP1), the first lower arm (SN1), the second upper arm (SP2), the second lower arm (SN2), the third upper arm (SP3) and the third lower arm (SN3) to allow the first inverter unit (I100) and the second inverter unit (I200) to drive the first compressor (C110) and the second compressor (C120) in a full-bridge configuration.

Accordingly, when the operation mode is a second operation mode, the first inverter unit (I100) and the second inverter unit (I200) may drive the first compressor (C110) and the second compressor (C120) in an interlocked manner to each other.

In this case, the first inverter unit (I100) and the second inverter unit (I200) may drive the first compressor (C110) and the second compressor (C120) in a full-bridge configuration.

Basically, the first inverter unit (I100) and the second inverter unit (I200) receive DC power (or DC voltage) from two capacitors located at the left side of a circuit illustrated in FIG. 6 to convert it to AC power (or AC voltage) based on the switching operation of switching elements (SP1-SN3), and drive the first compressor (C110) and the second compressor (C120) using the converted AC power in an independent or interlocking manner according to the operation mode.

According to an embodiment disclosed in the present disclosure, the first operation mode may be a power saving mode for driving a low load requiring a relatively lower cooling capacity compared to the second operation mode.

Furthermore, the second operation mode may be a power mode for driving a high load requiring a relatively higher cooling capacity compared to the first operation mode.

Describing the operation mode in detail, when the first inverter unit (I100) and the second inverter unit (I200) are always interlocked to drive the first compressor (C110) and the second compressor (C120) in a full-bridge configuration, it may be difficult to perform independent frequency control.

In other words, a driving frequency having an optimal efficiency may vary according to the state of the compressors, respectively, which is a load. For example, the frequency having an optimal efficiency may be determined by the foregoing M-K frequency.

In other words, if it is not a case that requires a relatively high cooling capacity (for example, the power mode), the first compressor (C110) and the second compressor (C120) may be preferably driven at optimal compression efficiencies, respectively.

In general, the optimal compression efficiency may be formed when a driving frequency of the inverter is identical to the M-K frequency.

Accordingly, when it is in a first operation mode which is a load state requiring a relatively low cooling capacity (compared to the second operation mode), the first inverter unit (I100) and the second inverter unit (I200) may be preferably operated at independent driving frequencies from each other.

However, when it is in a second operation mode which is a load state requiring a relatively high cooling capacity (compared to the first operation mode), the inverters should be operated in a full-power mode, and therefore, the first inverter unit (I100) and the second inverter unit (I200) are interlocked with each other to drive the first compressor (C110) and the second compressor (C120) in a full-bridge configuration.

Consequently, according to an embodiment, when the operation mode is the first operation mode, the driving frequency of the first inverter unit (I100) may be determined based on a compression efficiency of the first compressor (C110), and the driving frequency of the second inverter unit (I200) may be determined based on a compression efficiency of the second compressor (C120).

Furthermore, when the operation mode is the second operation mode, the driving frequency of the first inverter unit (I100) may be the same as that of the second inverter unit (I200).

In this case, the driving frequency of the first inverter unit (I100) and the driving frequency of the second inverter unit (I200) may be determined based on a compression efficiency of either one of the first compressor (C110) and the second compressor (C120).

In other words, when the operation mode is a power saving mode which is the first operation mode, the driving frequency of the first inverter unit (I100) and the second inverter unit (I200) may be independently determined to achieve an optimal compression efficiency of the first compressor (C110) and the second compressor (C120), respectively.

For example, the driving frequency of the first inverter unit (I100) may be 61 [Hz] which is the M-K frequency of the first compressor (C110), and the driving frequency of the second inverter unit (I200) may be 56.5 [Hz] which is the M-K frequency of the second compressor (C120).

Furthermore, when the operation mode is a power mode which is the second operation mode, the driving frequency of the first inverter unit (I100) and the second inverter unit (I200) may be determined based on a compression efficiency of either one of the first compressor (C110) and the second compressor (C120).

For example, the driving frequency of the first inverter unit (I100) and the second inverter unit (I200) may be set to the same, 56.5 [Hz], which is the M-K frequency of the second compressor (C120) in consideration of an optimal compression efficiency of the second compressor (C120).

The inverter module 100 according to an embodiment disclosed in the present disclosure may further include a connecting portion (R100) including a relay.

Specifically, referring to FIG. 6, the connecting portion (R100) may include a relay.

The controller may connect the N1 node to the N.C. node in the first operation mode to separate the first inverter unit (I100) from the second inverter unit (I200) (separation of two inverter units through relay control).

Furthermore, the controller may connect the N1 node to the N.O. node in the second operation mode to interlock the first inverter unit (I100) with the second inverter unit (I200) (interlocking of two inverter units through relay control).

There may be two types of relays.

First, basically (or using a default setting), there may be a relay in which the N1 node is connected to the N.C. (normally closed) node.

Next, basically (or using a default setting), there may be a relay in which the N1 node is connected to the N.O. (normally open) node.

Accordingly, according to a technology disclosed in the present disclosure, either one of the two types of relays may be used according to either one of the first operation mode and the second operation mode in the basic mode or default mode of the operation mode.

Figure 7:
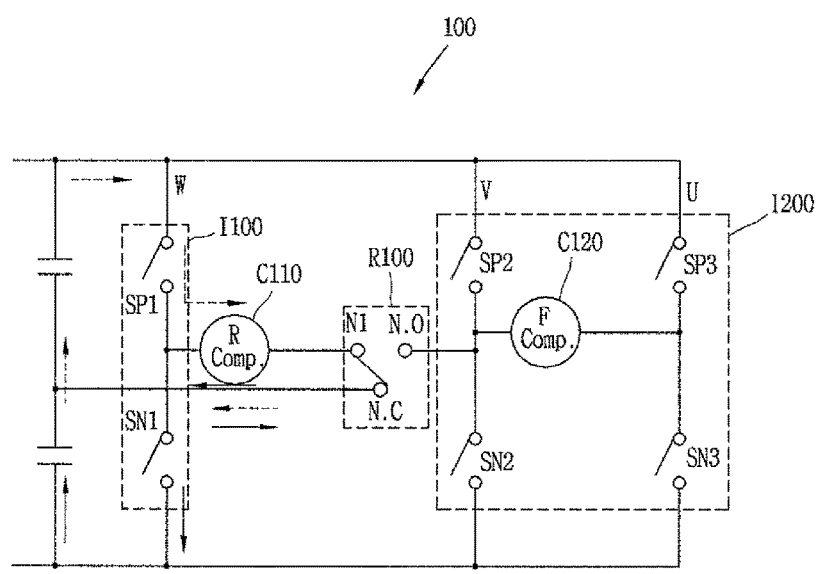
FIG. 7 is an exemplary view illustrating the operation of an inverter module in a first operation mode according to an embodiment disclosed in the present disclosure.

FIG. 7 is an exemplary view illustrating the operation of an inverter module in a first operation mode according to an embodiment disclosed in the present disclosure.

Referring to FIG. 7, it may be possible to check a current path of the first inverter unit (I100) within the inverter module 100 in the first operation mode. A dotted arrow indicates a positive current direction, and a solid arrow indicates a negative current direction.

As illustrated in FIG. 7, the controller may connect the N1 node to the N.C. node to operate the first inverter unit (I100) and the second inverter unit (I200) in a separate manner.

In this case, it is seen that the first inverter unit (I100) drives the first compressor (C110) in a half-bridge configuration according to a positive or negative current direction illustrated in FIG. 7.

Furthermore, the second inverter unit (I200) electrically separated from the first inverter unit (I100) can drive the second compressor (C120) in a full-bridge configuration based on the switching operation of the second upper arm, third upper arm, second lower arm and third lower arm (SP2, SP3, SN2, SN3).

The driving in a full-bridge configuration is an operation publicly known in the art, and thus the detailed description thereof will be omitted.

As described above, the first inverter unit (I100) and the second inverter unit (I200) illustrated in FIG. 7 are electrically separated from each other, and thus the controller can perform independent frequency control on the first compressor (C110) and second compressor (C120).

For example, the first inverter unit (I100) may have a driving frequency of 61 [Hz] in consideration of an optimal compression efficiency of the first compressor (C110), and the second inverter unit (I200) may have a driving frequency of 56.5 [Hz] in consideration of an optimal compression efficiency of the second compressor (C120).

Figure 8:
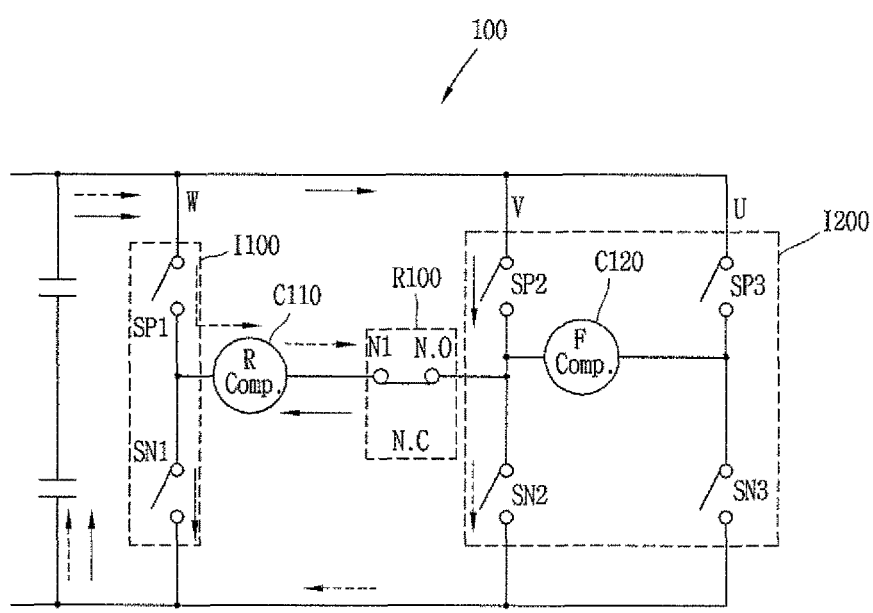
FIG. 8 is an exemplary view illustrating the operation of an inverter module in a second operation mode according to an embodiment disclosed in the present disclosure.

FIG. 8 is an exemplary view illustrating the operation of an inverter module in a second operation mode according to an embodiment disclosed in the present disclosure.

Referring to FIG. 8, it may be possible to check a current path of the first inverter unit (I100) within the inverter module 100 in the second operation mode. A dotted arrow indicates a positive current direction, and a solid arrow indicates a negative current direction.

As illustrated in FIG. 8, the controller may connect the N1 node to the N.O. node to operate the first inverter unit (I100) and the second inverter unit (I200) in an interlocking manner.

In this case, it is seen that the first inverter unit (I100) and the second inverter unit (I200) drive the first compressor (C110) and second compressor (C120) at the same time in a full-bridge configuration according to a positive or negative current direction illustrated in FIG. 8 (interlocking driving).

As described above, the first inverter unit (I100) and the second inverter unit (I200) illustrated in FIG. 8 are electrically connected to each other, and thus should have the same frequency.

In this case, the driving frequency may be determined based on an optimal compression efficiency of either one of the first compressor (C110) and the second compressor (C120).

For example, the driving frequency may be determined as 56.5 [Hz] in consideration of the compression efficiency of the second compressor (C120).

Method of Determining Operation Mode According to an Embodiment Disclosed in the Present Disclosure Hereinafter, a method of determining an operation mode according to an embodiment disclosed in the present disclosure will be described in more detail with reference to FIG. 9.

A method of determining an operation mode according to an embodiment disclosed in the present disclosure may be implemented by some or a combination of the configurations or processes included in the foregoing embodiments or implemented by a combination of the embodiments, and hereinafter, for the clear expression of the method of determining an operation mode according to an embodiment disclosed in the present disclosure, the redundant description thereof will be omitted.

An inverter module according to an embodiment may include a first inverter unit including a first upper arm and a first lower arm, a second inverter unit including a second upper arm, a second lower arm, a third upper arm and a third lower arm, and a controller configured to control the switching operation of the first upper arm and the first lower arm to allow the first inverter unit to drive a first compressor in a halfbridge configuration, and control the switching operation of the second upper arm, the second lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode.

According to an embodiment, the controller may set the operation mode of the inverter module to either one of the first operation mode and the second operation mode based on a specific criteria.

Furthermore, according to an embodiment, the specific criteria may be whether or not a cooling power required for the first compressor and the second compressor is greater than a reference cooling power or whether or not a motor input voltage required for a motor contained in either one of the first compressor and the second compressor is greater than an input voltage of the inverter module.

Furthermore, according to an embodiment, when the specific criteria is whether or not a cooling power required for the first compressor and the second compressor is greater than a reference cooling power, the controller may determine whether or not a cooling power required for the first compressor and the second compressor is greater than a reference cooling power, and as a result of the determination, when the required cooling capacity is greater than a reference cooling capacity, the controller may set the operation mode of the inverter module to the second operation mode.

Furthermore, when the required cooling capacity is less than a reference cooling capacity (i.e., in the opposite case), the controller may set the operation mode of the inverter module to the first operation mode.

Furthermore, according to an embodiment, the specific criteria is whether or not a motor input voltage required for a motor contained in either one of the first compressor and the second compressor is greater than an input voltage of the inverter module, the controller may determine whether or not a motor input voltage required for a motor contained in either one of the first compressor and the second compressor is greater than an input voltage of the inverter module, and as a result of the determination, when the required motor input voltage is greater than an input voltage of the inverter module, the controller may set the operation mode of the inverter module to the second operation mode.

Furthermore, when the required motor input voltage is less than an input voltage of the inverter module (i.e., in the opposite case), the controller may set the operation mode of the inverter module to the first operation mode.

Figure 9:
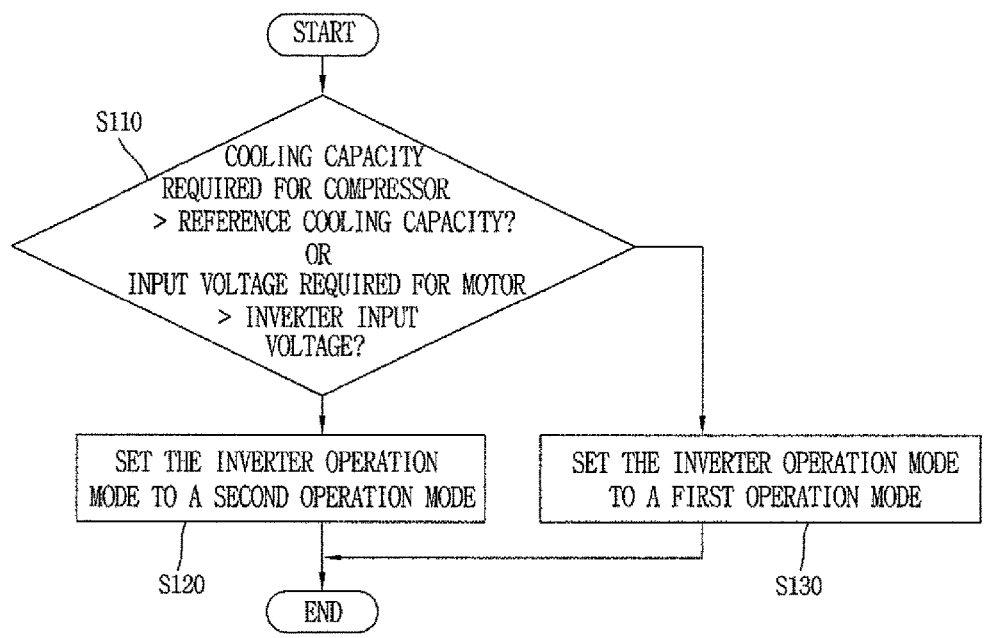
FIG. 9 is a flow chart illustrating an operation mode determination method according to an embodiment disclosed in the present disclosure.

FIG. 9 is a flow chart illustrating an operation mode determination method according to an embodiment disclosed in the present disclosure.

Referring to FIG. 9, a method of determining an operation mode according to an embodiment disclosed in the present disclosure may be carried out with the following steps.

First, the controller may determine whether or not the required cooling power of the compressor is greater than a reference cooling power or whether or not the required input voltage of the motor is greater than an input voltage of the inverter module (S110).

Next, as a result of the determination, when required cooling power of the compressor is greater than a reference cooling power or the required input voltage of the motor is greater than an input voltage of the inverter module, the controller may set the operation mode of the inverter module to the second operation mode (S120).

In the opposite case, the controller may set the operation mode of the inverter module to the first operation mode (S130).

Method of Changing Operation Mode According to an Embodiment Disclosed in the Present Disclosure Hereinafter, a method of changing an operation mode according to an embodiment disclosed in the present disclosure will be described in detail with reference to FIGS. 10 and 11.

A method of determining an operation mode according to an embodiment disclosed in the present disclosure may be implemented by some or a combination of the configurations or processes included in the foregoing embodiments or implemented by a combination of the embodiments, and hereinafter, for the clear expression of the method of determining an operation mode according to an embodiment disclosed in the present disclosure, the redundant description thereof will be omitted.

An inverter module according to an embodiment may include a first inverter unit including a first upper arm and a first lower arm, a second inverter unit including a second upper arm, a second lower arm, a third upper arm and a third lower arm, and a controller configured to control the switching operation of the first upper arm and the first lower arm to allow the first inverter unit to drive a first compressor in a halfbridge configuration, and control the switching operation of the second upper arm, the second lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode.

According to an embodiment, the controller may set the operation mode of the inverter module to either one of the first operation mode and the second operation mode based on a specific criteria.

Furthermore, according to an embodiment, the specific criteria may be whether or not a cooling power required for the first compressor and the second compressor is greater than a reference cooling power or whether or not a motor input voltage required for a motor contained in either one of the first compressor and the second compressor is greater than an input voltage of the inverter module.

Furthermore, according to an embodiment, when the specific criteria is whether or not a cooling power required for the first compressor and the second compressor is greater than a reference cooling power, the controller may determine whether or not a cooling power required for the first compressor and the second compressor is greater than a reference cooling power, and as a result of the determination, when the required cooling capacity is greater than a reference cooling capacity, the controller may set the operation mode of the inverter module to the second operation mode.

Furthermore, when the required cooling capacity is less than a reference cooling capacity (i.e., in the opposite case), the controller may set the operation mode of the inverter module to the first operation mode.

Furthermore, according to an embodiment, the specific criteria is whether or not a motor input voltage required for a motor contained in either one of the first compressor and the second compressor is greater than an input voltage of the inverter module, the controller may determine whether or not a motor input voltage required for a motor contained in either one of the first compressor and the second compressor is greater than an input voltage of the inverter module, and as a result of the determination, when the required motor input voltage is greater than an input voltage of the inverter module, the controller may set the operation mode of the inverter module to the second operation mode.

Furthermore, when the required motor input voltage is less than an input voltage of the inverter module (i.e., in the opposite case), the controller may set the operation mode of the inverter module to the first operation mode.

According to an embodiment, when the operation mode of the inverter module should be changed from either one of the first operation mode and the second operation mode to the other operation mode during the setting of the operation mode of the inverter module, the controller may deactivate the first compressor and the second compressor for a first period of time, and change the operation mode of the inverter module after a second period of time from a time point when the first compressor and the second compressor are deactivated, and activate the first compressor and the second compressor subsequent to changing the operation mode of the inverter module to operate the inverter module in the changed operation mode.

Furthermore, according to an embodiment, the first period of time may be greater than 10 seconds, and the second period of time may be 9 to 10 seconds.

Furthermore, according to an embodiment, the controller may activate the first compressor and the second compressor after a third period of time from a time point when the operation mode of the inverter module is changed.

Furthermore, according to an embodiment, the third period of time may be three seconds.

Figure 10:
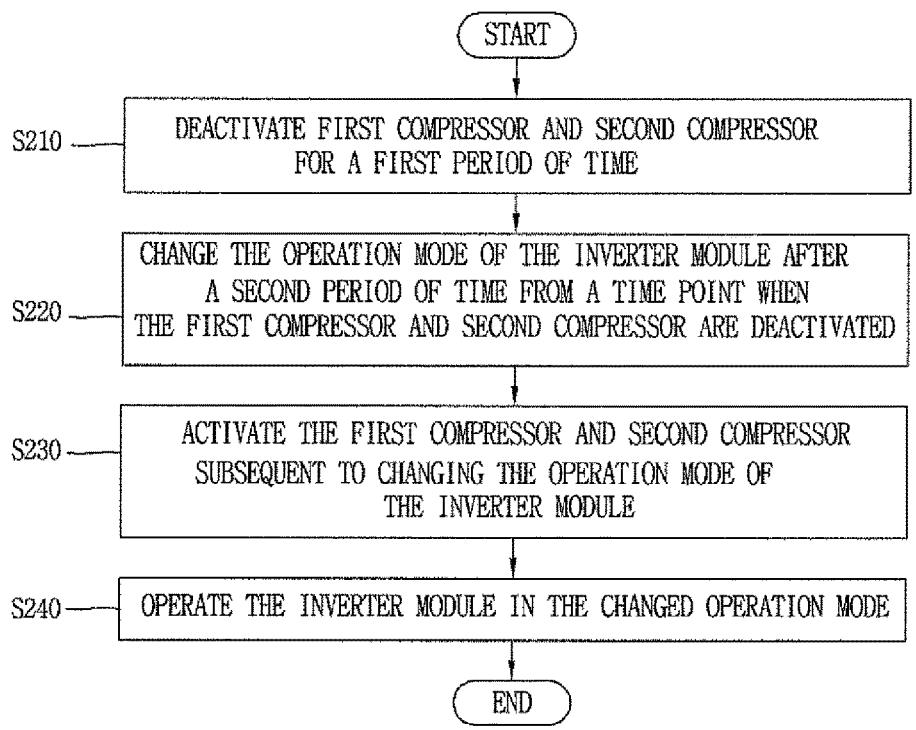
FIG. 10 is a flow chart illustrating an operation mode change method according to an embodiment disclosed in the present disclosure.

FIG. 10 is a flow chart illustrating an operation mode change method according to an embodiment disclosed in the present disclosure.

First, when the operation mode of the inverter module should be changed from either one of the first operation mode and the second operation mode to the other operation mode, the controller may deactivate the first compressor and the second compressor for a first period of time (S210).

Next, the controller may change the operation mode of the inverter module after a second period of time from a time point when the first compressor and the second compressor are deactivated (S220).

Next, the controller may activate the first compressor and the second compressor subsequent to changing the operation mode of the inverter module (S230).

Next, the controller may operate the inverter module in the changed operation mode (S240).

Figure 11:
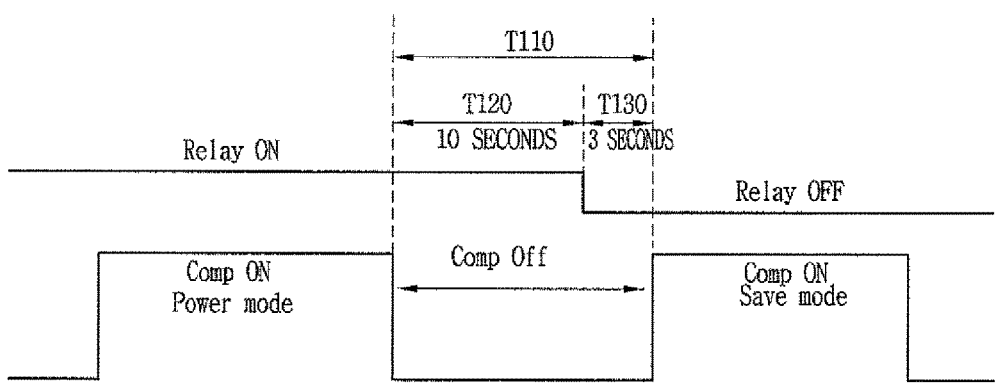
FIG. 11 is an exemplary view illustrating an operation mode change method according to an embodiment disclosed in the present disclosure.

FIG. 11 is an exemplary view illustrating an operation mode change method according to an embodiment disclosed in the present disclosure.

Referring to FIG. 11, the controller may turn on (ON, Comp ON Power mode) a relay in a power mode which is the second operation mode.

The on operation of the relay may denote that the foregoing N1 node is connected to the N.O. node.

Next, as a result of the determination based on the foregoing specific criteria, when the operation mode of the inverter module 100 should be changed from the second operation mode to a save mode which is the first operation mode, the controller may deactivate (or OFF, Comp OFF) the first compressor (C110) and the second compressor (C120) for a first period of time (T110).

The save mode may be the foregoing power saving mode.

According to an embodiment, the first period of time (T110) may be greater than 10 seconds.

FIG. 11 illustrates a case where the first period of time (T110) is 13 seconds.

Next, the controller may change the operation mode of the inverter module after a second period of time (T120) from a time point when the first compressor and the second compressor are deactivated.

According to an embodiment, the second period of time (T120) may be 9-10 seconds.

FIG. 11 illustrates a case where the second period of time (T120) is 10 seconds.

A change of the operation mode of the inverter module may be carried out through the relay control of the connecting portion.

Accordingly, the controller may change the relay from a relay-on state to a relay-off state to change the operation mode.

The relay-on state may denote a state in which the N1 node is connected to the N.O. node, and the relay-off state may denote a state in which the N1 node is connected to the N.C. node.

Next, the controller may activate the first compressor and the second compressor after a third period of time (T130) from a time point when the operation mode of the inverter module is changed (Comp ON Save mode).

Referring to FIG. 11, a time point when the operation mode of the inverter module is changed may denote a time point when the second period of time has passed from a time point when the compressor is deactivated (10 seconds in case of FIG. 11).

According to an embodiment, the third period of time may be equal to or greater than 3 seconds.

FIG. 11 illustrates a case where the third period of time is 3 seconds.

According to an inverter module disclosed in the present disclosure, a drawback in which voltage shortage occurs during the high cooling capacity operation of a half-bridge inverter using a relay has been solved, and one compressor may be driven in a half-bridge configuration to enable independent frequency control, thereby having an advantage that the operation of each compressor is enabled at the maximum efficiency point.

Furthermore, due to the characteristic of a half bridge, only a half of the input voltage may be used, and thus hardware is designed such that a relay is added to use a half and a full-bridge configuration in a mixed manner in order to output the maximum cooling capacity even in a compressor designed with the specification of 220 V.

Furthermore, a R-comp (first compressor, compressor for the refrigerating chamber) is driven in a half-bridge configuration and a F-comp (second compressor, compressor for the freezing chamber) is driven in a full-bridge configuration in a save mode, thereby implementing independent frequency. Accordingly, the efficiency of each compressor can be maximized, and during an initial installation or overload on which a hot object is placed, the contact point of the relay may be moved to the N.O. node and driven in a full-bridge configuration, thereby allowing a 220V-based full cooling capacity.

Furthermore, there is proposed a relay switching logic to secure the lifespan of a relay to the maximum when the relay is switched (or the operation mode is changed) while driving the compressor, thereby preventing the lifespan of the relay from being shortened due to an electrical arc generated on the relay.

In other words, hardware is designed to change the state of the relay to on or off while the compressor is off, and turn on the compressor again, thereby allowing the compressor to perform a stable operation mode.

According to an inverter module according to an embodiment disclosed in the present disclosure, there is an advantage that two linear compressors can be driven using one inverter module including three upper arm elements and three lower arm elements.

In particular, according to an inverter module according to an embodiment disclosed in the present disclosure, there is an advantage that two linear compressors are driven in a half-bridge configuration and in a full-bridge configuration, respectively, in a low load operation mode requiring a relatively low cooling power to allow independent driving frequency control, and the two linear compressors are both driven in a fullbridge configuration in a high load operation mode requiring a relatively high cooling power to allow high power control.

The scope of the present invention may not be limited to those specific embodiments, and thus various modifications, variations, and improvements can be made in the present invention without departing from the concept of the invention, and within the scope of the appended claims.

What is claimed is:

1. An inverter module, comprising:
   a first inverter unit comprising a first upper arm and a first lower arm;
   a second inverter unit comprising a second upper arm, a second lower arm, a third upper arm, and a third lower arm;
   a controller configured to control the switching operation of the first upper arm and the first lower arm to allow the first inverter unit to drive a first compressor in a half-bridge configuration, and control the switching operation of the second upper arm, the second lower arm, the third upper arm and the third lower arm to allow the second inverter unit to drive a second compressor in a full-bridge configuration during a first operation mode, and control the switching operation of the first upper arm, the first lower arm, the second upper arm, the second lower arm, the third upper arm and the third lower arm to allow the first inverter unit and the second inverter unit to drive the first compressor and the second compressor in a full-bridge configuration during a second operation mode; and
   a connecting portion comprising a relay, wherein the controller controls the relay to separate the first inverter unit from the second inverter unit in the first operation mode, and controls the relay to interlock the first inverter unit with the second inverter unit in the second operation mode.

2. The inverter module of claim 1, wherein the first compressor and the second compressor are linear compressors each comprising a linear motor.

3. The inverter module of claim 1, wherein the first compressor is a compressor that compresses refrigerant for a refrigerating chamber of a refrigerator, and the second compressor is a compressor that compresses refrigerant for a freezing chamber of the refrigerator.

4. The inverter module of claim 1, wherein in the first operation mode, a driving frequency of the first inverter unit is determined based on a compression efficiency of the first compressor, and a driving frequency of the second inverter unit is determined based on a compression efficiency of the second compressor.

5. The inverter module of claim 1, wherein in the second operation mode, a driving frequency of the first inverter unit and a driving frequency of the second inverter unit are the same.

6. The inverter module of claim 5, wherein the driving frequency of the first inverter unit and the driving frequency of the second inverter unit are determined based on a compression efficiency of one of the first compressor or the second compressor.

7. The inverter module of claim 1, wherein the first operation mode is a power saving mode for driving a low load requiring a relatively lower cooling capacity compared to the second operation mode, and the second operation mode is a power mode for driving a high load requiring a relatively higher cooling capacity compared to the first operation mode.

8. The inverter module of claim 1, wherein the controller sets an operation mode of the inverter module to one of the first operation mode or the second operation mode based on a specific criteria.

9. The inverter module of claim 8, wherein the specific criteria is whether or not a cooling power required for the first compressor and the second compressor is greater than a reference cooling power or whether or not a motor input voltage required for a motor contained in at least one of the first compressor or the second compressor is greater than an input voltage of the inverter module.

10. The inverter module of claim 9, wherein the specific criteria is whether or not a cooling power required for the first compressor and the second compressor is greater than a reference cooling power, and the controller sets the operation mode of the inverter module to the second operation mode when a cooling power required for the first compressor and the second compressor is greater than a reference cooling power, and sets the operation mode of the inverter module to the first operation mode in the opposite case.

11. The inverter module of claim 9, wherein the specific criteria is whether or not a motor input voltage required for a motor contained in at least one of the first compressor or the second compressor is greater than an input voltage of the inverter module, and the controller sets the operation mode of the inverter module to the second operation mode when a motor input voltage required for a motor contained in at least one of the first compressor or the second compressor is greater than an input voltage of the inverter module, and sets the operation mode of the inverter module to the first operation mode in the opposite case.

12. The inverter module of claim 8, wherein when the operation mode of the inverter module should be changed from one of the first operation mode or the second operation mode to the other operation mode during the setting of the operation mode of the inverter module, the controller deactivates the first compressor and the second compressor for a first period of time, and changes the operation mode of the inverter module after a second period of time from a time point when the first compressor and the second compressor are deactivated, and activates the first compressor and the second compressor subsequent to changing the operation mode of the inverter module to operate the inverter module in the changed operation mode.

13. The inverter module of claim 12, wherein the first period of time is greater than 10 seconds, and the second period of time is 9 to 10 seconds.

14. The inverter module of claim 12, wherein the controller activates the first compressor and the second compressor after a third period of time from a time point when the operation mode of the inverter module is changed.

15. The inverter module of claim 14, wherein the third period of time is three seconds.

16. A refrigerator, comprising:
a refrigerator body;
a first compressor and a second compressor provided in the refrigerator body to compress refrigerant; and
an inverter module configured to drive the first compressor and the second compressor, wherein the inverter module is the inverter module of claim 1.

* * * * *